UNITED STATES PATENT OFFICE.

CLYDE W. DAYTON, OF CHATSWORTH, CALIFORNIA.

PROCESS OF MAKING A BEVERAGE FROM HONEY.

1,038,307. Specification of Letters Patent. Patented Sept. 10, 1912.

No Drawing. Application filed September 29, 1910. Serial No. 584,525.

*To all whom it may concern:*

Be it known that I, CLYDE W. DAYTON, a citizen of the United States, residing at Chatsworth, in the county of Los Angeles and State of California, have invented new and useful Improvements in Processes of Making Beverages from Honey, of which the following is a specification.

This invention relates to a process for treating honey in such a manner that a highly nutritious and palatable beverage can be produced from honey which can be taken as an aid to the digestion of other foods.

The invention has for one of its objects to provide an extremely simple and inexpensive process for treating honey so that a comparatively large amount of liquor can be produced from a small quantity of honey, the liquor is highly nutritious and closely resembling rich apple or grape juice freshly expressed.

In carrying out the process, one and one-half to two pounds of extracted honey is placed in a suitable receptacle, such for instance as a glazed crock or jar of about a gallon capacity, the size of the container and the amount of honey used varying according to the amount of fermented liquor that is to be produced. The crock is then supplied with pure water and the contents stirred to such a point that the water at the surface will be quite sweet and yet a layer of a half inch, more or less, of undissolved honey will remain in the bottom of the crock. The contents of the crock are subjected to a temperature preferably about 55 or 60 degrees Fahrenheit. This temperature is continued for a number of days until the fermenting begins, the period varying in practice from two to five days, according to variations in quality of the water or honey used, the season of the year, and environments.

In order to determine when the fermenting begins, a straw or other tube is inserted in the liquid to a point within about one-half inch from the stratum of undissolved honey and a draft is produced through the straw to suck up a portion of the liquid in order to test it. If the liquid has a sharp and acid taste, the fermenting has evidently begun, but if the liquid still is sweetish, it is allowed to stand a little longer.

After the fermenting has been well started, the liquid is poured from the crock into suitable containers such as bottles, but care is taken to stir the fermenting honey and water together until the liquid is a little sweeter than to be agreeable to the taste. This stirring will thoroughly spread the ferment germs into the liquid that is poured into the bottles and the fermenting will thereby be accelerated. The bottles are placed in the temperature of about fifty-five degrees, and in from six to ten hours the liquid will acquire a sharp biting taste, although it will possess sufficient sweetness to be pleasant to the taste. Ordinary honey a year or more old and which has been stored in properly ventilated containers, treated in this manner could easily be mistaken for rich apple or grape juice freshly expressed.

In making up a second batch of liquor, a small portion of the preceding ferment liquid should be left in the crock to hasten the fermenting of the new batch and also a small quantity may be left in the bottles to hasten the fermenting action.

It is preferable to begin the fermentation in a crock rather than to arrange a starter and sweetened water in the bottles, because ferment germs should be obtained freshly of the honey to prevent "running out" or "degrading." It is accomplished by keeping the undissolved honey in the bottom of the crock. Again, if the ferment germs are turned free in the sweet water, the time when the liquor will be ready for use cannot be so readily controlled, mainly because there will always be a variation in the vitality of the ferment starter. In operating from the ferment in the undissolved honey the starter is always nearly the same.

A honey fermentation liquor made according to this process can be taken as an aid to digestion of other foods and it can be made in the home in small quantities as needed. The liquor has a higher digestive quality than others containing ferments which set in and develop at higher temperatures than seventy degrees Fahrenheit. By securing a ferment over and in contact with the layer of undissolved honey prevents lower orders of ferment germs from starting, which results in a liquor of superior quality.

Having thus described the invention, what I claim as new, is:—

The process of treating honey consisting in mixing a quantity of honey and water in which a portion of the honey is dissolved and a portion remains un-dissolved, subjecting the mass to a temperature of about fifty-five or sixty degrees Fahrenheit to promote fermentation, mixing the fermenting mass, and bottling the mass, for completing the fermentation, maintaining the bottled mass at a temperature of about fifty-five degrees in which the fermentation is completed.

In testimony whereof I affix my signature in presence of two witnesses.

CLYDE W. DAYTON.

Witnesses:
 JAMES C. NELSON,
 A. C. TREXLER.